Patented Nov. 15, 1938

2,136,653

UNITED STATES PATENT OFFICE 2,136,653

HYDROGENATION OF SOYA BEAN OIL

Harold E. Moore and Ralph B. Vogel, Columbus, Ohio, assignors to The Capital City Products Company, Columbus, Ohio, a corporation of Delaware No Drawing. Application October 7, 1936, Serial No. 104,502

2 Claims. (Cl. 99—118)

Our invention relates to margarine and oils for use therein. It has to do particularly with margarine or other butter substitutes and to an oil developed primarily from the soya bean as well as the method by which such oil is developed, though soya bean oil may be supplemented by other oils that will be referred to.

In the making of margarine or other butter substitutes, it is desirable to provide certain physical and taste characteristics which will be similar to and equal to or better in quality than those characteristics commonly found in natural butter. Among the physical characteristics which are important are those that insure that the product will have a proper degree of hardness and a melting point sufficiently high that it will not melt and soften too readily at room temperature and yet will have good spreading properties. At the same time, the melting point should be sufficiently low that the product will cut properly and melt in the mouth properly. Likewise, the product should not be sticky or gummy, either during the cutting operation or after being placed in the mouth of the user. In addition, the product should have a taste comparable to natural butter and should be free from the tendency to turn rancid under all normal conditions of storage or use. These characteristics in the finished product are greatly affected by the types of oils used therein, by the methods of treatments of such oils, such as hydrogenation, and by the ingredients and percentages thereof in the oils finally developed by hydrogenation.

In the prior art, considerable effort has been devoted to the development of oils for use in the production of margarine or other butter substitutes, particularly in the development of cotton seed oils, cocoanut oils, peanut oils, corn oils and the like. However, little has been done in the development of soya bean oil so as to render it suitable for margarine or other butter substitutes. At least, if any such development work has been done, there is at the present time no soya bean oil suitable for margarine or other butter substitutes that is being marketed to any substantial extent nor is there any margarine or other butter substitute being marketed which contains soya bean oil in substantial quantities.

One of the objects of the present invention is to provide a soya bean oil which has been so treated or developed that it may be utilized satisfactorily as an important component of margarine or other butter substitutes.

Another object of this invention is to provide a margarine or other butter substitute wherein a soya bean oil is used as an important component thereof, which margarine or other butter substitute will possess the various physical and taste characteristics referred to above.

We have found that, by the hydrogenation of soya bean oil in a certain way and under certain conditions, we are able to produce an oil having such characteristics that, when used in a margarine or other butter substitute, there will result a product having the various physical and taste characteristics alluded to above, in an exceptionally high degree.

Natural soya bean oil is composed largely of the following glycerides:

| | Percent |
|---|---|
| Linolenic acid glyceride | 2.3 |
| Linoleic acid glyceride | 51.5 |
| Oleic acid glyceride | 33.4 |
| Palmitic acid glyceride | 6.8 |
| Stearic acid glyceride | 4.4 |

The remainder of the oil consists largely of sterols and phosphatides.

Considering this composition of soya bean oil, we have realized that it has certain characteristics which render it unsuitable as an oil for the making of margarine or other butter substitutes. For example, it will be noted that it has a large combined percentage of linolenic and linoleic acid glycerides. Linolenic acid glyceride contains three double bonds and linoleic acid glyceride contains two double bonds. One result of this is that these glycerides easily absorb oxygen from the air and, in consequence, tend to become rancid so readily that they render the oil in its natural state unsuitable for use in the making of margarine or other butter substitutes. Likewise, the linolenic acid glycerides, the linoleic acid glycerides and the oleic acid glycerides, being of a liquid nature, are so soft and have such low melting points that some means must be found to offset these characteristics if there is to be produced, from natural soya bean oil, an oil that will be suitable for the making of margarine or other butter substitutes. An obvious method of overcoming this is to hydrogenate this natural soya bean oil so as to increase the percentage of saturated fatty acid glycerides, that is, stearic acid glycerides, to increase the hardness of the oil as a whole. However, we have found that the oleic acid glycerides should be present in certain minimum percentages. Also, we have found that the presence of palmitic acid glycerides and stearic acid glycerides in too high percentages results in undue hardness as well as in stickiness and gumminess of the final oil. We have also found that an oil containing no other glycerides than those set forth in the above tabulated ingredients of natural soya bean oil will either have too high a melting point with attendant stickiness and gumminess or too low a melting point with undue softness.

In view of these facts, we have sought for a way to eliminate the linolenic acid glycerides and to reduce to a minimum the linoleic acid glycerides while retaining a sufficient quantity of oleic acid glycerides and, at the same time, avoiding the formation of too high a percentage of the stearic acid glycerides. Pursuing this research, we have conceived that desirable results might be obtained by developing in the oil certain percentages of iso-oleic acid glycerides, because of the fact that iso-oleic acid glycerides have a considerably higher melting point than oleic acid glycerides and, at the same time, are free from the stickiness or gumminess characteristic of palmitic acid and stearic acid glycerides.

Putting our invention into practice, we have taken the natural soya bean oil and refined it by treating it with caustic soda, washing it with water and then drying it so that the phosphatides are largely eliminated therefrom. Then, we have resorted to hydrogenation of this refined soya bean oil under conditions which depart from the usual conditions of hydrogenation of oils used for the purpose in question. For example, we have used temperatures which are higher than those customarily used in the hydrogenation of oils to be used for the making of margarine or other butter substitutes. Also, we have used a relatively inactive catalyst so that the hydrogenation process may be prolonged. Then, we have prolonged this hydrogenation process so that iso-oleic acid glycerides may be formed in relatively large quantities and so that the palmitic and stearic acid glycerides will only be present in relatively small quantities.

In one form of our method, we selected a nickel catalyst which had been reduced at high temperatures and which had been washed only slightly so that it was not entirely free from sulphates or chlorides. In this form, we used 100 grams of nickel sulphate containing either 6 or 7 molecules of water of crystallization dissolved in 700 cc. of distilled water. 60 grams of filtercel was then added. The mixture was well stirred and a solution of soda ash was added until the mixture was slightly alkaline towards phenolphthalein and there was formed at that time a light green precipitate. This precipitate was washed three times by decantation with distilled water. This wash by decantation did not remove all of the sulphates. A portion of the sodium sulphate was allowed to remain with the catalyst in order to cut down its activity.

This green precipitate was then filtered and pulled dry by a suction pump. The green catalyst cake was then dried at a temperature of 105° C. for 10 or 12 hours. It was then ground up very finely and reduced in an atmosphere of hydrogen at a temperature of 427° C. for approximately 10 hours. The reduced catalyst was then cooled and a stream of dried carbon dioxide was passed thereover. The catalyst material was then dumped into soya bean oil to protect it from the oxygen of the air. This catalyst, although it did not have a high degree of activity, was found to be excellent for the purpose of prolonging the hydrogenation process which we have found to be necessary to produce relatively large quantities of iso-oleic acid glycerides in the finished oil by hydrogenation.

Three-tenths of one per cent on the basis of the nickel of the catalyst thus produced was used to hydrogenate the refined soya bean oil, although larger or smaller percentages may be used. Hydrogenation was carried on at a temperature ranging between 205° and 225° C. Hydrogenation was carried on at this temperature for 3 hours. At the end of that time, it was found by analysis that there had been produced a soya bean oil of the following composition:

| | Per cent |
|---|---|
| Saturated acid glycerides | 17.5 |
| Iso-oleic acid glycerides | 34.2 |
| Linoleic acid glycerides | 7.8 |
| Oleic acid glycerides | 40.5 |

Physical tests of this soya bean oil showed that it had a melting point of approximately 35° C. and a congealing point of about 300° C. This oil, when properly deodorized under a high vacuum with superheated steam at a temperature of 205° C., produced excellent oil for the manufacture of margarine or other butter substitutes. It was mixed with cultured milk and salt in the following percentages:

| | Per cent |
|---|---|
| Hydrogenated oil | 82.0 |
| Salt | 3.0 |
| Cultured milk | 15.0 |

This composition was emulsified or churned, then poured into ice water, collected and converted into a print. There resulted therefrom a margarine having properties equal to or superior to natural butter and better than margarines previously made. It had a proper degree of hardness and a sufficiently high melting point to prevent undue softening or melting under normal conditions of storage or use. It cut smoothly and cleanly. It was free from stickiness or gumminess either during cutting or in the mouth of the user. It had exceptionally good spreading qualities. Likewise, it remained free from rancidity when kept for substantial periods of time at ice box temperatures.

Our tests have shown that by slight variations of the steps of our method, such as the temperatures, the time periods and the catalysts used, we can produce hydrogenated soya bean oil suitable for use in margarine or other butter substitutes having the following ranges of ingredients:

| | Per cent |
|---|---|
| Saturated acid glycerides | 15 to 20 |
| Linoleic acid glycerides | 0 to 10 |
| Iso-oleic acid glycerides | 20 to 50 |
| Linolenic acid glycerides | 0 |
| Balance—oleic acid glycerides. | |

We prefer that the hydrogenated margarine oils made by our method shall have an iodine value of between 65 and 80, that the melting point shall be between 32° and 38° C. and that the congealing point shall be between 25° and 32° C., and we have found that we are able to attain these desirable characteristics in a soya bean oil having these ingredients in the ranges specified.

Our temperatures and time periods for hydrogenation may vary considerably. For example, hydrogenation may be carried on at temperatures ranging from 177° to 225° C. Likewise, the period of hydrogenation may be more than 3 hours and may be as much as 6 hours or longer, depending upon the results to be obtained or desired. Both temperature and time period may be varied somewhat depending upon the activity and type of catalyst being used and upon the violence of the agitation during the hydrogenation process.

Various other catalysts may be used in our hydrogenation process. For example, we may also use a nickel-copper catalyst. Thus, we have used a catalyst made by dissolving 100 grams of nickel sulphate and 20 grams of copper sulphate in about 600 cc. of water, to which 60 grams of filtercel was added and the nickel-copper precipitated by means of a soda ash solution. This catalyst was washed by decantation three times, filtered and dried and then reduced as in the example previously described. Three-tenths of one per cent on the basis of the nickel was then added to the refined soya bean oil, although larger or smaller percentages may be used. The oil was hydrogenated at a temperature ranging between 205° and 225° C. for a period of 3 hours. Equivalent results were obtained by the use of this catalyst.

In the performance of our method for producing our hydrogenated soya bean oil, we may utilize a nickel catalyst or a nickel-copper catalyst which was originally active but which has been used previously for a sufficiently large number of times so that it has lost the larger part of its activity. As a matter of fact, we may use any type of catalyst suitable for the hydrogenation of oils of this type, provided it is sufficiently inactive to permit of prolonging the hydrogenation period for the attainment of the results indicated above.

If desired, small amounts of other soft vegetable oils, such as cotton seed oil or corn oil, in percentages ranging from 3 to 10 per cent may be added to our hydrogenated soya bean oil to make it softer and to give the margarine better spreading qualities. Also, if desired, a small amount of cotton seed oil stearine of 60° C. melting point or higher may be added to help stabilize the margarine. Cocoanut oil, when mixed with this hydrogenated soya bean oil and then emulsified with milk culture in the usual manner also produces very desirable margarine.

It will be seen from the above that we have been able to produce a hydrogenated soya bean oil which does not contain over 20 percent of the saturated fatty acid glycerides, which shows an extremely slight increase over the normal 10 or 12 per cent of the saturated fatty acid glycerides normally present in natural soya bean oil. Thus, we have been able to avoid the excessive hardness, stickiness and gumminess which would otherwise result from the development of relatively high percentages of saturated fatty acid glycerides. At the same time, we have been able to impart adequate hardness and increased melting point to the hydrogenated oil by the development of relatively large percentages of iso-oleic acid glycerides which are free from stickiness and gumminess and which have a melting point of 45° C. compared with the melting point of 14° C. which is characteristic of oleic acid glycerides. It will also be seen that we have been able to eliminate the linolenic acid glycerides and to reduce to a negligible amount the linoleic acid glycerides, so that danger of rancidity of the oil and the margarine or other butter substitutes made therefrom is obviated for all normal conditions of use or storage.

It is within the scope of our invention to produce a margarine or other butter substitute which contains, in addition to the hydrogenated soya bean oil, cultured milk and salt, other ingredients such as an anti-spattering compound. Preferably such anti-spattering compound would range from .1 per cent to 1 per cent of the total compound making up the margarine or other butter substitute.

Soya bean oil is relatively cheap and plentiful and the sources of supply thereof are on the increase. Therefore, we have produced an oil for use in the making of margarine or other butter substitutes having all of the desirable characteristics and susceptible of production at a relatively low cost.

Likewise, it will be apparent that we have produced a soya bean oil, which when utilized in the making of margarine or other butter substitutes will possess adequate hardness and freedom from melting or softening at normal temperatures of use and storage. Moreover, a margarine or other butter substitute made from this oil, either alone or in combination with fairly large percentages of other oils, will spread readily at fairly low temperatures and maintain its form at fairly high temperatures better than creamery butter. Likewise, both the oil and the margarine or other butter substitute will be free from rancidity under normal conditions of use and storage.

It will be understood that the procedures set forth above are given merely as examples. We do not desire to limit ourselves to the various steps of the methods described and consider that any oil or margarine or other butter substitutes made therefrom having the characteristics set forth herein are within the scope of our invention.

Having thus described our invention, what we claim is:

1. The method of producing an oil for use in margarine or other butter substitutes which comprises hydrogenating a soya bean oil at temperatures ranging from 177° to 225° C. for a period of 3 hours or more in the presence of a relatively inactive catalyst so as to substantially eliminate the linolenic acid glycerides, to reduce the linoleic acid glycerides to less than 10 per cent and to develop an iso-oleic acid glyceride content of between 20 and 50 per cent with a saturated acid glyceride content not exceeding 20 per cent.

2. The method of producing an oil for use in margarine or other butter substitutes which comprises hydrogenating a soya bean oil at a temperature ranging from 205° to 225° C. for a period of 3 hours or more in the presence of a relatively inactive catalyst so as to substantially eliminate the linolenic acid glycerides, to reduce the linoleic acid glyceride content to less than 10 per cent and to produce an iso-oleic acid glyceride content ranging from 20 to 50 per cent with the saturated acid glyceride content not exceeding 20 per cent and the balance principally oleic acid glycerides.

HAROLD E. MOORE.
RALPH B. VOGEL.